(12) United States Patent
Pullela et al.

(10) Patent No.: US 7,724,728 B2
(45) Date of Patent: May 25, 2010

(54) POLICY-BASED PROCESSING OF PACKETS

(75) Inventors: Venkateshwar Rao Pullela, San Jose, CA (US); Ambarish Kenghe, Aurora, CO (US); Ramesh V N Ponnapalli, Karnataka (IN); Dileep Kumar Devireddy, San Jose, CA (US); Suresh Gurajapu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 884 days.

(21) Appl. No.: 11/122,612

(22) Filed: May 5, 2005

(65) Prior Publication Data

US 2006/0233173 A1 Oct. 19, 2006

Related U.S. Application Data

(60) Provisional application No. 60/672,705, filed on Apr. 19, 2005.

(51) Int. Cl.
  *H04L 12/66* (2006.01)
  *H04L 12/28* (2006.01)
  *G06F 7/04* (2006.01)
  *G06F 9/00* (2006.01)

(52) U.S. Cl. ............... 370/352; 370/392; 370/395.2; 370/395.42; 726/4; 726/13

(58) Field of Classification Search ......... 370/352–356, 370/395.2, 395.21, 395.3, 395.42
See application file for complete search history.

(56) References Cited

U.S. PATENT DOCUMENTS

| | | | |
|---|---|---|---|
| 6,147,976 A | 11/2000 | Shand et al. | |
| 6,377,577 B1 | 4/2002 | Bechtolsheim et al. | |
| 6,535,951 B1 | 3/2003 | Ross | |
| 6,658,002 B1 | 12/2003 | Ross et al. | |
| 6,715,029 B1 | 3/2004 | Trainin et al. | |
| 6,871,262 B1 | 3/2005 | Oren et al. | |

(Continued)

OTHER PUBLICATIONS

U.S. Appl. No. 10/159,055, filed May 31, 2002, Venkateshwar Rao Pullela.

(Continued)

*Primary Examiner*—Huy D Vu
*Assistant Examiner*—Brandon Renner
(74) *Attorney, Agent, or Firm*—The Law Office of Kirk D. Williams

(57) ABSTRACT

Disclosed are, inter alia, methods, apparatus, data structures, computer-readable media, and mechanisms, for policy-based processing of packets, including mechanisms for managing the policies. A user is authenticated and its user group identifier is identified. A packet is received and is associated with the user group identifier, and one or more fields (typically other than the source address field) of the packet are used to identify a second group identifier. A lookup operation is then performed on a policy based on the first and second group identifiers to identify a packet processing action to be performed on the packet. These identifiers are typically not network addresses, which disassociates the policy from physical network addresses (which often are dynamically assigned and may also vary based on the access point into the network of a user), and allows a switching device to process packets based on a policy stated using group identifiers.

11 Claims, 8 Drawing Sheets

U.S. PATENT DOCUMENTS

| | | | |
|---|---|---|---|
| 6,871,265 B1 | 3/2005 | Oren et al. | |
| 6,961,808 B1 | 11/2005 | Oren et al. | |
| 6,981,029 B1 * | 12/2005 | Menditto et al. | 709/217 |
| 7,065,083 B1 | 6/2006 | Oren et al. | |
| 7,082,102 B1 * | 7/2006 | Wright | 370/229 |
| 7,082,492 B2 | 7/2006 | Pullela et al. | |
| 7,177,978 B2 | 2/2007 | Kanekar et al. | |
| 7,240,149 B1 | 7/2007 | Nagaraj et al. | |
| 7,502,929 B1 * | 3/2009 | Schnizlein et al. | 713/168 |
| 2002/0083344 A1 * | 6/2002 | Vairavan | 713/201 |
| 2002/0126633 A1 * | 9/2002 | Mizutani et al. | 370/329 |
| 2002/0126672 A1 | 9/2002 | Chow et al. | |
| 2003/0084287 A1 * | 5/2003 | Wang et al. | 713/168 |
| 2004/0004968 A1 * | 1/2004 | Nassar | 370/401 |
| 2004/0019786 A1 * | 1/2004 | Zorn et al. | 713/168 |
| 2004/0243832 A1 * | 12/2004 | Wilf et al. | 713/200 |
| 2005/0055570 A1 * | 3/2005 | Kwan et al. | 713/201 |
| 2005/0076245 A1 * | 4/2005 | Graham et al. | 713/201 |
| 2005/0180429 A1 * | 8/2005 | Ghahremani et al. | 370/395.21 |
| 2005/0220099 A1 * | 10/2005 | Igarashi | 370/389 |
| 2005/0262294 A1 * | 11/2005 | Bitar | 711/108 |
| 2006/0002351 A1 * | 1/2006 | Madour | 370/338 |
| 2006/0233173 A1 | 10/2006 | Pullela et al. | |

OTHER PUBLICATIONS

U.S. Appl. No. 11/114,349, filed Apr. 26, 2005, Kogan et al.

* cited by examiner

ACL Configuration:

100 ↓

```
set security acl ip acl_cfg deny ip host 10.6.62.1   host 172.20.55.21
set security acl ip acl_cfg deny ip host 10.6.62.23  host 172.20.55.21
set security acl ip acl_cfg deny ip host 10.6.62.65  host 172.20.55.21
set security acl ip acl_cfg deny ip host 10.6.62.57  host 172.20.55.21
set security acl ip acl_cfg deny ip host 10.6.62.81  host 172.20.55.21
set security acl ip acl_cfg deny ip host 10.6.62.95  host 172.20.55.21
set security acl ip acl_cfg deny ip host 10.6.62.43  host 172.20.55.21
set security acl ip acl_cfg deny ip host 10.6.62.67  host 172.20.55.21
set security acl ip acl_cfg deny ip host 10.6.62.47  host 172.20.55.21
set security acl ip acl_cfg deny ip host 10.6.62.101 host 172.20.55.21
                 .
                 .
                 .
set security acl ip acl_cfg permit ip any any
set security acl map acl_cfg 100
```

PRIOR ART
FIGURE 1

```
                                    220
Policy Configuration:                │
                                     ▼
set policy group user_group_1 hosts 10.6.62.1 10.6.62.23 10.6.62.65 10.6.62.57
10.6.62.81 10.6.62.95 10.6.62.43 10.6.62.67 10.6.62.47 10.6.62.101 set policy group server_group_1 hosts 172.20.55.21 172.20.55.61 172.20.55.83
172.20.55.87 172.20.55.91 172.20.55.46 172.20.55.49 172.20.55.68 172.20.55.101
171.20.55.73 set security acl ip policy_cfg deny group user_group_1 group server_group_1 set security acl ip policy_cfg permit ip any any set security acl map policy_cfg 100
```

Policy Configuration: 300

```
set policy group user_group_1 users user_1 user_2 user_3 user_4 user_5 user_6
user_7 user_8 user_9 user_10
set policy group server_group_1 hosts 172.20.55.21 172.20.55.61 172.20.55.83
172.20.55.87 172.20.55.91 172.20.55.46 172.20.55.49 172.20.55.68 172.20.55.101
171.20.55.73
set security acl ip policy_cfg deny group user_group_1 group server_group_1
set security acl ip policy_cfg permit ip any any set security acl map policy_cfg 100
```

FIGURE 3A

Policy Configuration: 310

```
set policy group Mgrs users user_1 user_2 user_3
set policy group MgrServers hosts server_1 server_2
set policy group MgrApps hosts server_1 server_2
set security acl ip policy_cfg permit Mgrs MgrServers MgrApps
set security acl ip policy_cfg deny ip any any set security acl map policy_cfg 100
```

FIGURE 3B

Policy Configuration: 320

```
set security acl ip policy_cfg permit Mgrs MgrServers MgrApps
set security acl ip policy_cfg deny ip any any set security acl map policy_cfg 100
```

FIGURE 3C

POLICY-BASED PROCESSING OF PACKETS

CROSS-REFERENCE TO RELATED APPLICATIONS

This application claims the benefit of U.S. Provisional Application No. 60/672,705, filed Apr. 19, 2005, which is hereby incorporated by reference in its entirety.

TECHNICAL FIELD

One embodiment of the invention relates to communications and computer systems, especially computers, routers, packet switching systems, and other devices; and more particularly, one embodiment relates to policy-based processing of packets, including mechanisms for managing the policies.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches, etc.) to support these new protocols and services. However, known software and firmware implementations are relatively slow, and typically place a performance bound which may be incompatible with new requirements. Various applications that use packet classification, such as Security Access Control, Quality of Service, etc., typically need to perform many matches on source and destination port numbers, protocol and/or other header fields, etc. in order to identify a corresponding netflow.

In a known prior system, one or more fields are extracted from a received packet. These one or more extracted fields typically include source and destination addresses, port numbers, and possibly other fields, typically included in the header or flow label of a packet. These extracted fields are provided in their native format, possibly along with other data, to a CAM, which performs a lookup operation in performing the packet classification. Because CAMs are expensive, especially in terms of space and power consumption and are limited in the width of an input lookup word, one known system preprocesses, via one or more logical functions or operations, certain information contained in a packet to generate a vector that is used as part of a lookup word. This vector reduces the number of bits that would be required if the entire native information was included in the lookup word. However, such known preprocessing only operates on the information contained in a received packet and not from any other source.

Programming an ACL can be a complex and/or redundant task. Typically, each network or possibly even host system requires a separate series of ACL entries. One known system reduces the overall numbers of ACLs by assigning virtual local area network (VLAN) identifiers to entities (e.g., networks, hosts, and router interfaces). A common ACL can then be shared by multiple entities by mapping their VLAN identifiers to a shared VLAN label, with this shared VLAN label being used to identify the common ACL or entries thereof.

However, in many situations, ACLs used on different interfaces are not the same as, for example, they might have different security requirements. Also, different interfaces may belong to different subnets and use different IP addresses; and thus, for example, separate ACLs entries must be used to verify that the source address of a packet sent from an interface matches the address of the interface. This creates a difficulty especially in the case of a dial-in public network, where the connecting computer and user varies, and the only mechanism currently available to ensure that a packet sent from the connected computer is authorized (e.g., its source address corresponds to the one assigned to it by the dial-in system), is to use a separate ACL for each interface, which can be quite tenuous and expensive as each ACL must be programmed separately.

For example, assume an ACL is needed for a VLAN to disallow ten specific users from accessing ten specific servers and allows all other traffic from these users, and no additional restrictions are being placed on this VLAN. In a network where IP addresses are dynamically assigned, it is impossible to implement this using a classical ACL model because these IP addresses for these users are not known in advance. Even in the case where these users always get their same IP address, the ACL on this VLAN will have one hundred ACL entries (i.e., the cross-product of ten users and ten servers). A portion of an example of this configuration is shown in ACL 100 in FIG. 1. Should more servers and/or users need to be specified, the number of entries grows dramatically.

Dynamic Host Configuration Protocol (DHCP) is a commonly used mechanism to dynamically assign an IP address to a host. Typically, a host broadcasts a message which is responded to by a DHCP server which provides the new address for the requesting host.

Another service that is currently used in a network is user authentication using an 802.1x port-based authentication protocol. Typically, when a host connects to a physical port on the switch/router, it is prompted for a username. The switch/router passes the username to an authentication server, which sends a challenge to which is responded in order to authenticate the host (essentially the user on the host). Along with authenticating the user to the switch/router, the authentication server can also pass some more information about the user. The traffic of an unauthenticated host/user is typically blocked until it is authenticated. The 802.1x port-based authentication protocol has been implemented on Windows XP, Linux, and various other operating systems and is slated to become standard security feature in most enterprises.

It is desired that security and other features be provided to reflect the dynamic nature of network address assignment, as well as host/user authentication.

SUMMARY OF THE INVENTION

Disclosed are, inter alia, methods, apparatus, data structures, computer-readable media, and mechanisms, for policy-based processing of packets, including mechanisms for managing the policies. One embodiment authenticates a user and receives a user group identifier corresponding to the authenticated user. A packet is received and one or more fields (typically other than the source address field) are used to identify a second group identifier. A lookup operation is then performed on a policy based on the first and second group identifiers to identify a packet processing action to be performed on the packet. These identifiers are typically not network addresses, which disassociates the policy from physical network addresses (which often are dynamically assigned and may also vary based on the access point into the network of a user), and allows a switching device to process packets based on a policy stated using group identifiers.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 1 is a block diagram illustrating a prior art listing of an access control list;

FIG. 3A is a block diagram of a listing of a policy used in one embodiment;

FIG. 3B is a block diagram of a listing of a policy used in one embodiment;

FIG. 3C is a block diagram of a listing of a policy used in one embodiment;

DETAILED DESCRIPTION

Figures 2A, 2B:
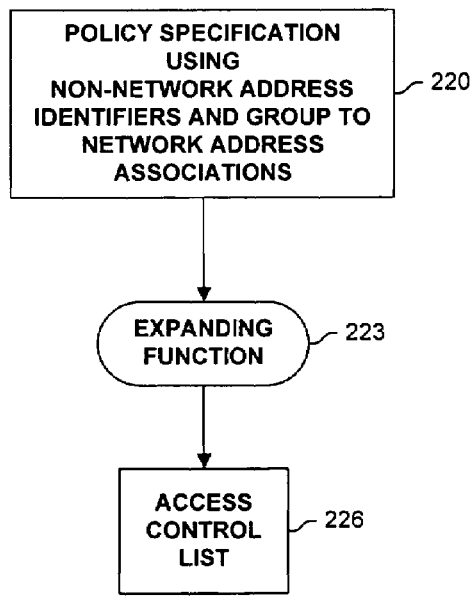
FIG. 2A is a block diagram of a listing of a policy used in one embodiment.
FIG. 2B is a block diagram illustrating the generation of an access control list from a policy as performed in one embodiment.

Systems and methods are disclosed for policy-based processing of packets, including mechanisms for managing the policies. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for policy-based processing of packets, including mechanisms for managing the policies. One embodiment authenticates a user and receives a user group identifier corresponding to the authenticated user. A packet is received and one or more fields (typically other than the source address field) are used to identify a second group identifier. A lookup operation is then performed on a policy based on the first and second group identifiers to identify a packet processing action to be performed on the packet. These identifiers are typically not network addresses, which disassociates the policy from physical network addresses (which often are dynamically assigned and may also vary based on the access point into the network of a user), and allows a switching device to process packets based on a policy stated using group identifiers.

According to one embodiment, a packet switching device authenticates a user and receives a non-network address user group identifier corresponding to the authenticated user. Note, as used herein, the adjective "non-network address" is used to describe an identifier such as "managers" or "101", but not a network address such as 10.0.0.1 or 10.0.*.*. A packet, including a source address and a second field, is received, and the received packet is associated with the non-network address user group identifier. A second non-network address group identifier is identified based on the second field. A lookup operation is performed on a policy based on the non-network address user group identifier and the second non-network address group identifier to identify a packet processing action to be performed on the received packet.

In one embodiment, the second field includes a destination address. In one embodiment, the destination address corresponds to a server. In one embodiment, these policies do not include any specified network addresses. In one embodiment, these policies are received from a policy server located remotely from the packet switching device. In one embodiment, in response to identifying that the packet switching device does not have a policy corresponding to the non-network address user group identifier, at least one policy is requested from a policy server prior to the receiving of the one or more policies.

One embodiment processes packets based on a policy identifying a non-network address first group identifier corresponding to a first group and a non-network address second group identifier corresponding to a second group, with the first group including a first user and a second user and the second group including a first server. A first packet switching device receives the policy, and a second packet switching device receives the policy. The first packet switching device receives a first plurality of packets from the first user and processes the first plurality of packets based on the policy to control access to the first server. The second packet switching device receives a second plurality of packets from the second user and processes the second plurality of packets based on the policy to control access to the first server.

In one embodiment, the policy does not specify the first user nor the second user. In one embodiment, the policy does not specify the first server. In one embodiment, the processing the first plurality of packets based on the policy includes performing a lookup operation on the policy based on the first group identifier and the second group identifier. In one embodiment, the processing of the second plurality of packets based on the policy includes performing a lookup operation on the policy based on the first group identifier and the second group identifier.

One embodiment processes packets based on a policy identifying a non-network address first group identifier corresponding to a first group and a non-network address second group identifier corresponding to a second group, with the first group including a first user and a second user and the second group including a first server and a second server. A first packet switching device receives the policy. A second packet switching device receives the policy. The first packet switching device receives a first plurality of packets from the first user and processes the first plurality of packets based on the policy to control access to the first server, the second packet switching device receives a second plurality of packets from the second user and processes the second plurality of packets based on the policy to control access to the second server.

In one embodiment, the policy does not specify the first user nor the second user. In one embodiment, the policy does not specify the first server nor the second server. In one embodiment, the processing of the first plurality of packets based on the policy includes performing a lookup operation on the policy based on the first group identifier and the second group identifier. In one embodiment, the processing the second plurality of packets based on the policy includes performing a lookup operation on the policy based on the first group identifier and the second group identifier.

According to one embodiment, a packet switching device authenticates a user using 802.1x protocol with a server and in response, receives a non-network address user group identifier corresponding to the authenticated user from the server. For each particular packet of a plurality of packets received from the user: a lookup is performed based on a non-source address field of the plurality packet to identify a second non-network address identifier, and a lookup operation is performed on a policy based on the non-network address user group identifier and the second non network address identifier to identify a packet processing action to be performed on the particular packet.

In one embodiment, the policy is propagated to a plurality of packet switching devices, and the non-network address user group identifier is associated with a plurality of users. In one embodiment, the policy is programmed into one or more associative memories, and the lookup on the policy includes performing a lookup operation on the one or more associative memories. In one embodiment, the one or more associative memories includes at least one ternary content-addressable memory.

One embodiment for processing a packet includes input interface circuitry configured to receive the packet, the packet including a source address field and a second field; a source user group association mechanism configured to associate a non-network address user source group identifier with the packet; a group lookup mechanism configured to identify a second non-network address group identifier based on the second field; and a policy lookup mechanism configured to perform a lookup operation on a policy based on the non-network address user group identifier and the second non network address identifier to identify a packet processing action to be performed on the particular packet.

In one embodiment, the policy lookup mechanism includes an associative memory programmed with the policy. In one embodiment, the group lookup mechanism includes a second associative memory programmed with an association between the second field and the second non-network address group identifier.

FIG. 2A is a block diagram of a listing 220 of a policy used in one embodiment. One embodiment specifies groups of one or more network address values. These groups can then be used in a policy to specify the actions to be performed, and thus the definition of the policy is typically easier to read and update. One embodiment uses such a specification of the groups and policies to produce the programming of a traditional access control list, and thus can be used by a prior art switching devices, such as by loading into an associative memory.

FIG. 2B illustrates the generation of an access control list from the definition of the policy (e.g., policy definition 220 illustrated in FIG. 2A). A policy specification typically includes the specification a set of network address associations which are to be identified by a non-network address identifier. For example, user_group_1 and server_group_1 (of FIG. 2A) are non-network address identifiers, with each being associated with several network addresses. An expanding function 223 expands a policy action statement using the non-network address identifier(s) to produce the access control list 226. Thus, for example, policy definition 220 of FIG. 2A can be expanded to produce access control list 100 illustrated in FIG. 1, with policy definition 220 consisting of a lot fewer statements. By using group identifiers, the number of entries listed in the definition of an access control list can possibly be significantly decreased (e.g., compare FIGS. 2A and 3A-C with FIG. 1), and thus, typically prone to fewer errors, as well as being easier to specify, read, and understood by a human. Additionally, the membership of the groups referenced in the policy definition can be changed while the policy statements stay the same (e.g., for a different location, or a change in users), which also may reduce errors as well as provide scalability.

FIGS. 3A-C illustrate a few of an unlimited number of different policy listings possibly that can used in one embodiment. For example, policy listing 300 of FIG. 3A illustrates that some non-network address group identifiers can be associated with non-network address values (e.g., identifiers associated with a user during an authentication procedure) or specified network addresses, with these non-network address group identifiers used in defining the policy. Policy listing 310 of FIG. 3B illustrates that one policy specification associates network address group identifiers only with non-network address values. Policy listing 320 of FIG. 3C illustrates that one policy specification merely specifies the policy actions using non-network address group identifiers (e.g., Mgrs, MgrServers, MgrApps) without defining the users/hosts associated with these non-network address group identifiers as these are defined elsewhere. As policy listing 320 shows, it is easy to define policy actions that can be readily understood, as policy listing 320 allows managers (Mgrs) to access manager servers (Mgr_Servers) and manager applications (MgrApps) and prevents others from accessing these manager servers and applications. By allowing the membership in these groups to be defined elsewhere, the specification of the policy becomes shorter, and one embodiment can process packets based on the policy specification without requiring it to be expanded. Also, by not defining network addresses for the group identifier Mgrs and allowing this association to be made elsewhere, such as during an authentication process, the access control list is not bound by the network addresses of users, which can vary especially if DHCP is used to assign IP addresses and if users access a network from physically different locations (e.g., traveling, dial-in access, etc.).

Figure 3D:
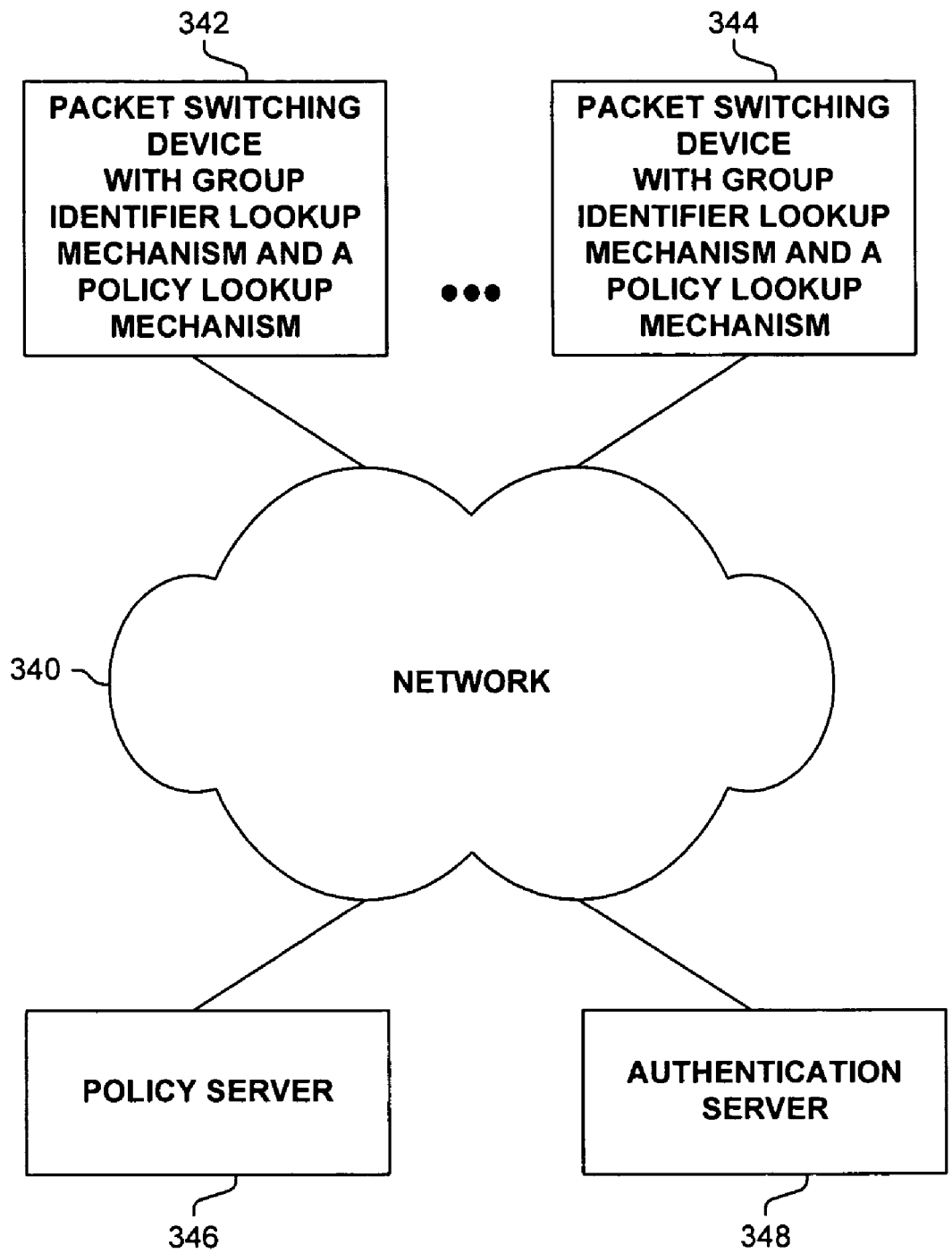
FIG. 3D is a block diagram illustrating a network with multiple packet switching devices implementing one or more policies.

FIG. 3D is a block diagram illustrating a network 340 with multiple packet switching devices 342-344 implementing one or more policies. Each packet switching device 342-344 includes a policy lookup mechanism (e.g., a data structure/data base, one or more associative memories, etc.) for determining a processing action (e.g., allow, deny, forward, QoS, etc.) to perform on a received packet based on one or more defined policies and one or more non-network address group identifiers associated with the received packet. In one embodiment, each packet switching device 342-344 includes a group identifier lookup mechanism to determine a non-network address group identifier based on one or more values, such as, but not limited to one or more fields of a packet and/or one or more characteristics associated a packet. Thus, for example, a received packet may be associated with a first group identifier (e.g., based on its source address or associated therewith during an authentication process of the user/host using authentication server 348) and a second group identifier (e.g., determined via a lookup operation on a destination address of a packet and/or other fields or characteristics). In one embodiment, a policy server 346 manages the policies for each switching device 342-344. In one embodiment, policy server 346 provides a same policy to each switching device 342-344 based on which it determines how to process packets.

Figure 4A:
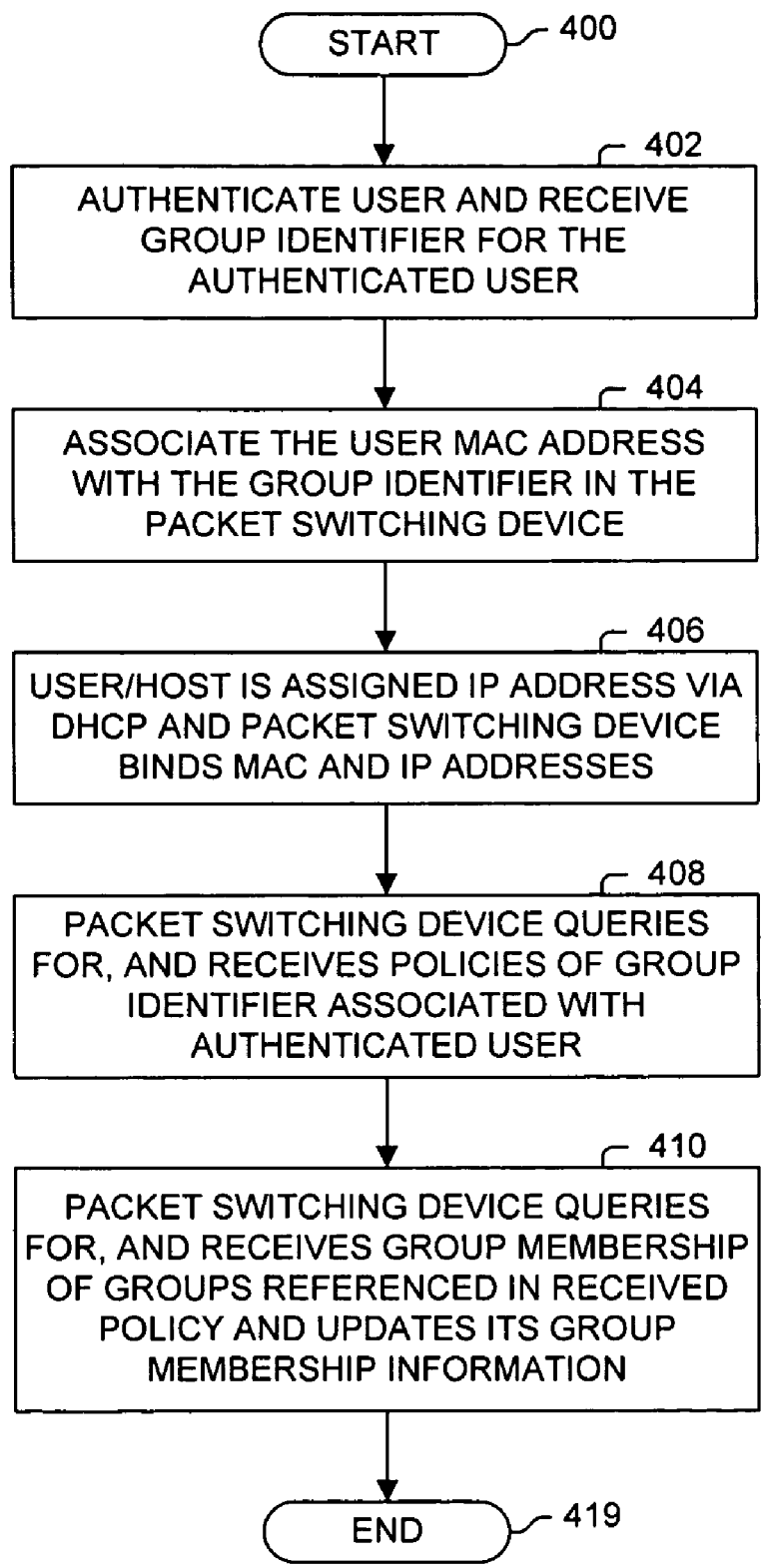
FIG. 4A is a flow diagram illustrating a process used in one embodiment for policy-based processing of packets.

FIG. 4A is a flow diagram illustrating a process used in one embodiment for policy-based processing of packets. Processing begins at process block 400, and proceeds to process block 402, wherein a user is authenticated (e.g., using 802.1x protocol in conjunction with an authentication server) by a packet switching device, and this packet switching device receives a group identifier for the authenticated user. Note, the related terms user and host are used interchangeably herein.

In process block 404, the MAC address corresponding to the user is associated with the group identifier in the packet switching device. In process block 406, the user is assigned an IP address via DHCP, and the packet switching device binds the MAC and IP addresses. In process block 408, the packet switching device queries for, and receives from the policy server one or more policies associated with the received group identifier. In process block 410, the packet switching device queries for, and receives from the policy server (or another server) group membership information of the groups referenced in the received policy, and updates its group membership information in its group identifier lookup mechanism (e.g., data structure, associative memory, etc.). Processing of the flow diagram of FIG. 4A is complete as indicated by process block 419.

Figure 4B:
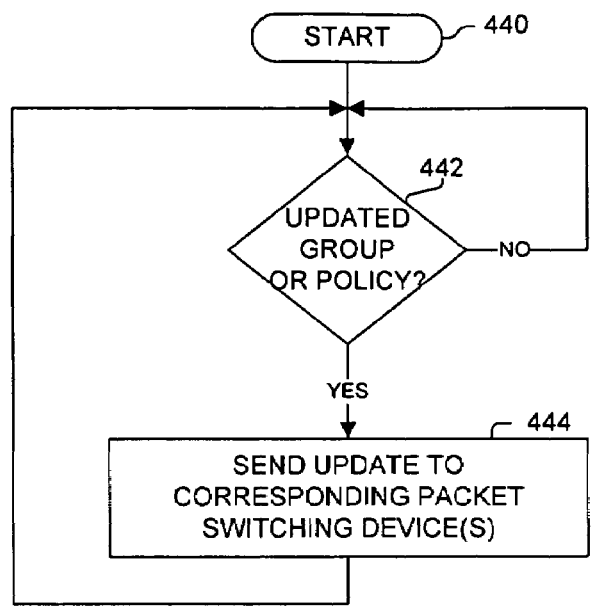
FIG. 4B is a flow diagram illustrating a process used in one embodiment for updating groups or policies for processing of packets.

In one embodiment, the policy and/or group memberships are dynamic in nature, and may be dynamically updated. One such process used in one embodiment is illustrated in FIG. 4B. Processing begins with process block 440. As determined in process block 442, if a group membership or policy needs updating, then in process block 444, the group membership or policy is updated in the relevant switches, and processing returns to process block 442.

One embodiment maintains a data structure identifying the policies and groups being used by each packet switching device so that it knows what packet switching devices to update. In one embodiment, when a user changes to a different group, the corresponding group and/or policy information is sent to the corresponding packet switching device(s) as required. In one embodiment, when a policy is updated, the relevant packet switching device(s) are notified so they can query for the updated information. In one embodiment, in response to a server is added to a server group, this updated group information is pushed to the relevant packet switching device(s). In one embodiment, when a user is added to a group, the updated group information is pushed to the relevant packet switching device(s); while in one embodiment, the information in not pushed to the relevant packet switching device(s).

Figure 5A:
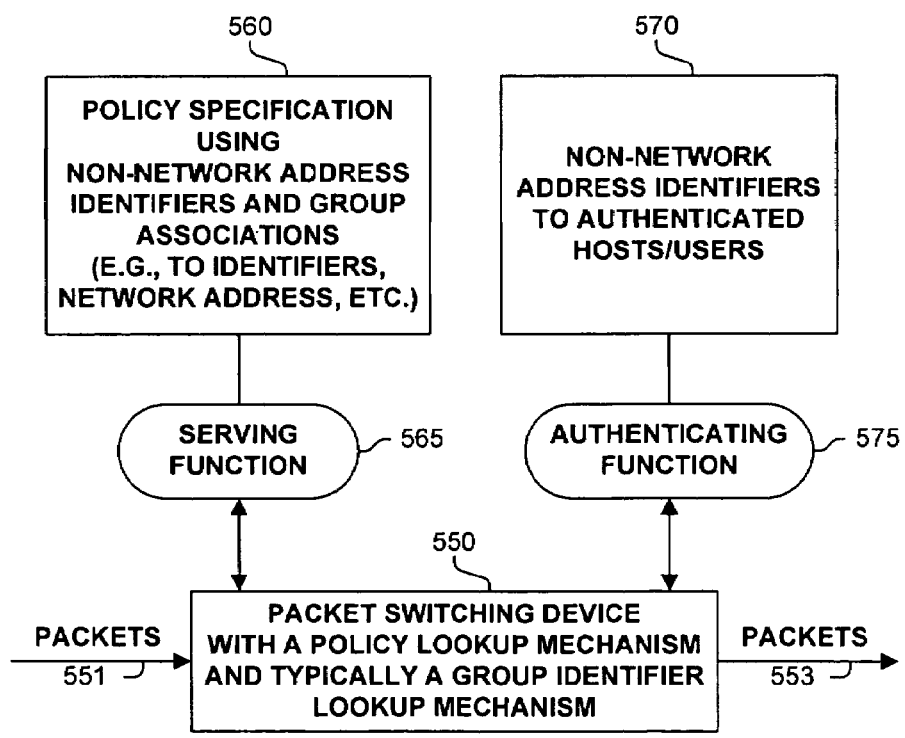
FIG. 5A is a block diagram illustrating the implementation of a policy as performed in one embodiment.

FIG. 5A is a block diagram illustrating the implementation of a policy as performed in one embodiment. A packet switching device 550 includes a policy lookup mechanism (e.g., a data structure/data base, one or more associative memories, etc.) for determining a processing action (e.g., allow, deny, forward and/or to where, etc.) to perform on a received packet 551 (e.g., forwarding as a packet 553) based on one or more defined policies and one or more group identifiers associated with the received packet. Packet switching device 550 typically also includes a group identifier lookup mechanism (e.g., a data structure/data base, one or more associative memories, etc.) for identifying a second group identifier based on one or more fields of the received packet and/or one or more characteristics (e.g., QoS, received interface, type of traffic, etc.) associated with the packet.

Packet switching device typically communicates with an authenticating function 575 (e.g., co-located, internal to packet switching device 550, or remotely located) for authenticating a user based on a received packet 551 if the user has not been already authenticated. Authenticating function 575 typically includes a data structure 570 or communicates with a server including a data structure 570 which associates an authenticated user with a first group identifier to be associated with packets corresponding to the authenticated user. Also, packet switching device 550 typically communicates with a serving function 565 (e.g., co-located, internal to packet switching device 550, or remotely located) for providing packet switching device 550 one or more policies and possibly membership information for relevant group identifiers from its policy and/or group identifier data structure 560.

Figure 5B:
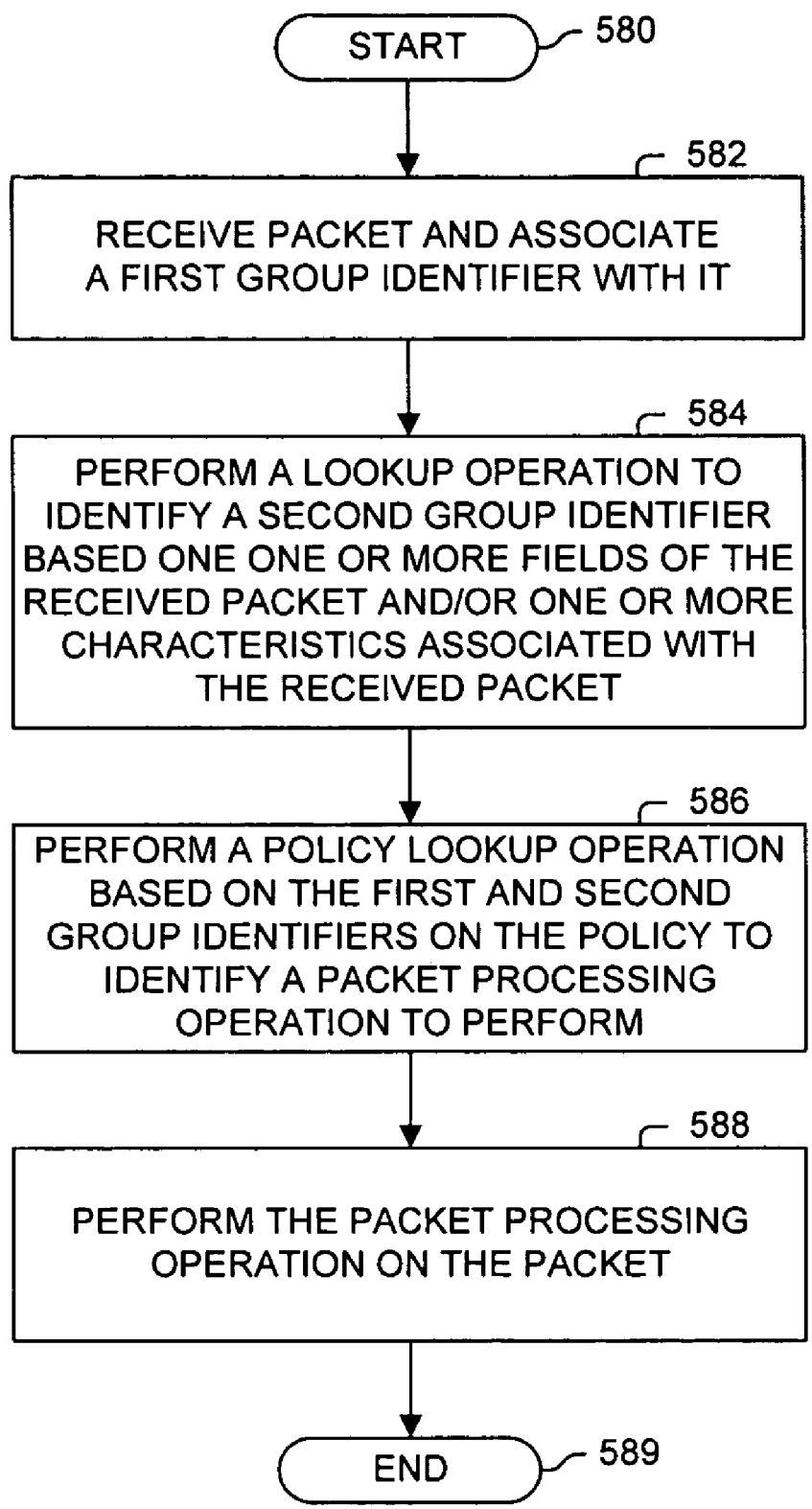
FIG. 5B is a flow diagram illustrating a process used in one embodiment for policy-based processing of packets.

FIG. 5B is a flow diagram illustrating a process used in one embodiment for policy-based processing of packets. Processing begins with process block 580, and proceeds to process block 582, wherein a packet is received and a first group identifier is associated with the packet. In process block 584, a lookup operation is performed to identify a second group identifier based on one or more fields of the received packet and/or one or more characteristics associated with the packet. In process block 586, a policy lookup operation is performed based on the first and second group identifiers to identify a packet processing operation to perform on the received packet, which is performed in process block 588. Processing of the flow diagram illustrated in FIG. 5B is complete as indicated by process block 589.

Figure 6:
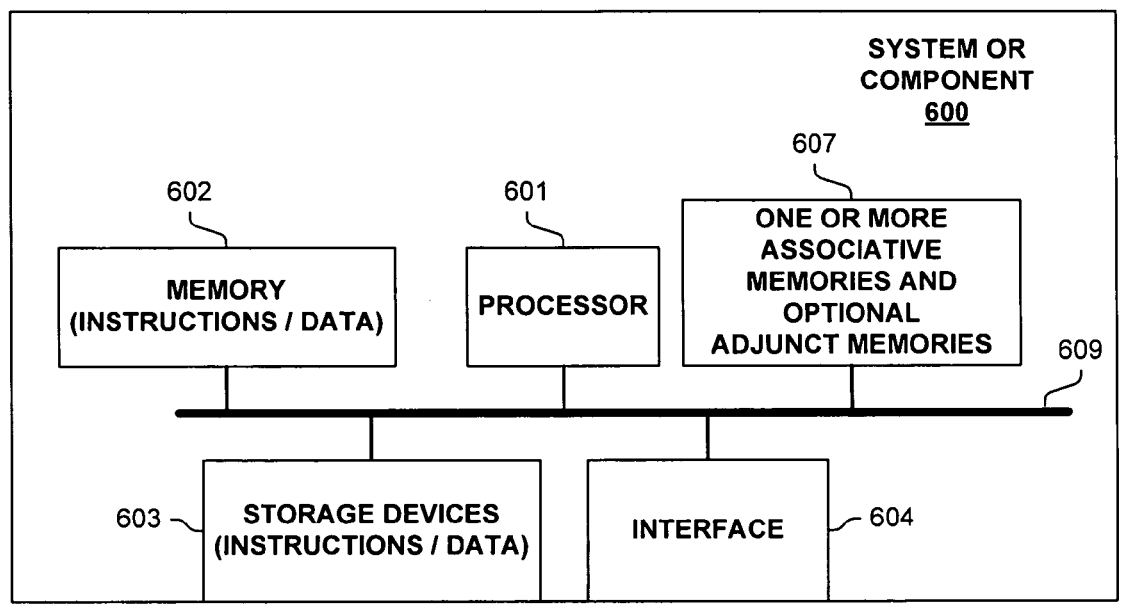
FIG. 6 illustrates a system or component used in one embodiment for policy-based processing of packets.

FIG. 6 illustrates a system used in one embodiment for policy-based processing of packets. In one embodiment, system 600 includes a processor 601, memory 602, storage devices 603, and interface 604 for receiving and transmitting packets or other processed information, and one or more associative memories and optional adjunct memories 607 (e.g., an associative and adjunct memory for performing group identifier lookup operations and an associative and adjunct memory for performing policy lookup operations), which are coupled via one or more communications mechanisms 609 (shown as a bus for illustrative purposes).

Various embodiments of system 600 may include more or less elements. The operation of system 600 is typically controlled by processor 601 using memory 602 and storage devices 603 to perform one or more tasks or processes, such as programming associative memories and optional adjunct memories 607 based on received policy and/or group identifier information.

Memory 602 is one type of computer-readable medium, and typically comprises random access memory (RAM), read only memory (ROM), flash memory, integrated circuits, and/or other memory components. Memory 602 typically stores computer-executable instructions to be executed by processor 601 and/or data which is manipulated by processor 601 for implementing functionality in accordance with one embodiment of the invention. Storage devices 603 are another type of computer-readable medium, and typically comprise solid state storage media, disk drives, diskettes, networked services, tape drives, and other storage devices. Storage devices 603 typically store computer-executable instructions to be executed by processor 601 and/or data which is manipulated by processor 601 for implementing functionality in accordance with one embodiment of the invention.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for processing packets performed by a packet switching device, the method comprising:
   authenticating a user and configuring the packet switching device to process a plurality of packets from the user using one or more policies, with said operations of authenticating the user and configuring the packet switching device including: using an authentication server to determine that the user is authorized, and in response, receiving a non-network address user group identifier corresponding to said authenticated user from the authentication server; associating a source address of the user with said received non-network address user group identifier for use in identifying the non-network address user group identifier, by the packet switching device, for packets received from the user; and querying a policy server based on said received non-network address user group identifier, and in response, receiving said one or more policies associated with the non-network address user group identifier for use in determining how the packet switching device should process packets from the user; and
   subsequent to said operations of authenticating the user and configuring the packet switching device, for each particular packet of the plurality of packets: receiving said particular packet, with said particular packet including the source address and a second field; associating the non-network address user group identifier with said received particular packet based on the source address of said particular packet; identifying a second non-network address group identifier based on the second field of said received particular packet; performing a lookup operation, based on the non-network address user group identifier and the second non-network address group identifier without the source address nor the second field, on said received one or more policies to identify a packet processing action to be performed on said received particular packet; and processing, by the packet switching device, said received particular packet based on the packet processing action said identified.

2. The method of claim 1, wherein the second field includes a destination address.

3. The method of claim 2, wherein the destination address corresponds to a server.

4. The method of claim 1, wherein said one or more policies do not include any network addresses.

5. The method of claim 1, wherein said one or more policies are received from the policy server located remotely from the packet switching device.

6. The method of claim 1, wherein the user is assigned an Internet Protocol address for use in sending packets subsequent to said receipt of the non-network address user group identifier corresponding to said authenticated user.

7. The method of claim 1, wherein the said one or more policies are defined to the policy server in at least one access control list (ACL).

8. A packet switching device, comprising:
   means for authenticating a user and configuring the packet switching device to process a plurality of packets from the user using one or more policies configured to perform operations including: using an authentication server to determine that the user is authorized, and in response, receiving a non-network address user group identifier corresponding to said authenticated user from the authentication server; associating a source address of the user with said received non-network address user group identifier for use in identifying the non-network address user group identifier, by the packet switching device, for packets received from the user; and querying a policy server based on said received non-network address user group identifier, and in response, receiving said one or more policies associated with the non-network address user group identifier for use in determining how the packet switching device should process packets from the user; and means for receiving and processing each particular packet of the plurality of packets configured to perform particular operations subsequent to said means for authenticating a user and configuring the packet switching device said authenticating the user and configuring the packet switching device, with said particular operations including: receiving said particular packet, with said particular packet including the source address and a second field; associating the non-network address user group identifier with said received particular packet based on the source address of said particular packet; identifying a second non-network address group identifier based on the second field of said received particular packet; performing a lookup operation, based on the non-network address user group identifier and the second non-network address group identifier without the source address nor the second field, on said received one or more policies to identify a packet processing action to be performed on said received particular packet; and processing, by the packet switching device, said received particular packet based on the packet processing action said identified.

9. The packet switching device of claim 8, wherein the policy server is located remotely from the packet switching device.

10. The packet switching device of claim 8, wherein the user is assigned an Internet Protocol address for use in sending packets subsequent to said receipt of the non-network address user group identifier corresponding to said authenticated user.

11. The packet switching device of claim 8, wherein the said one or more policies are defined to the policy server in at least one access control list (ACL).

* * * * *